Patented Sept. 10, 1935

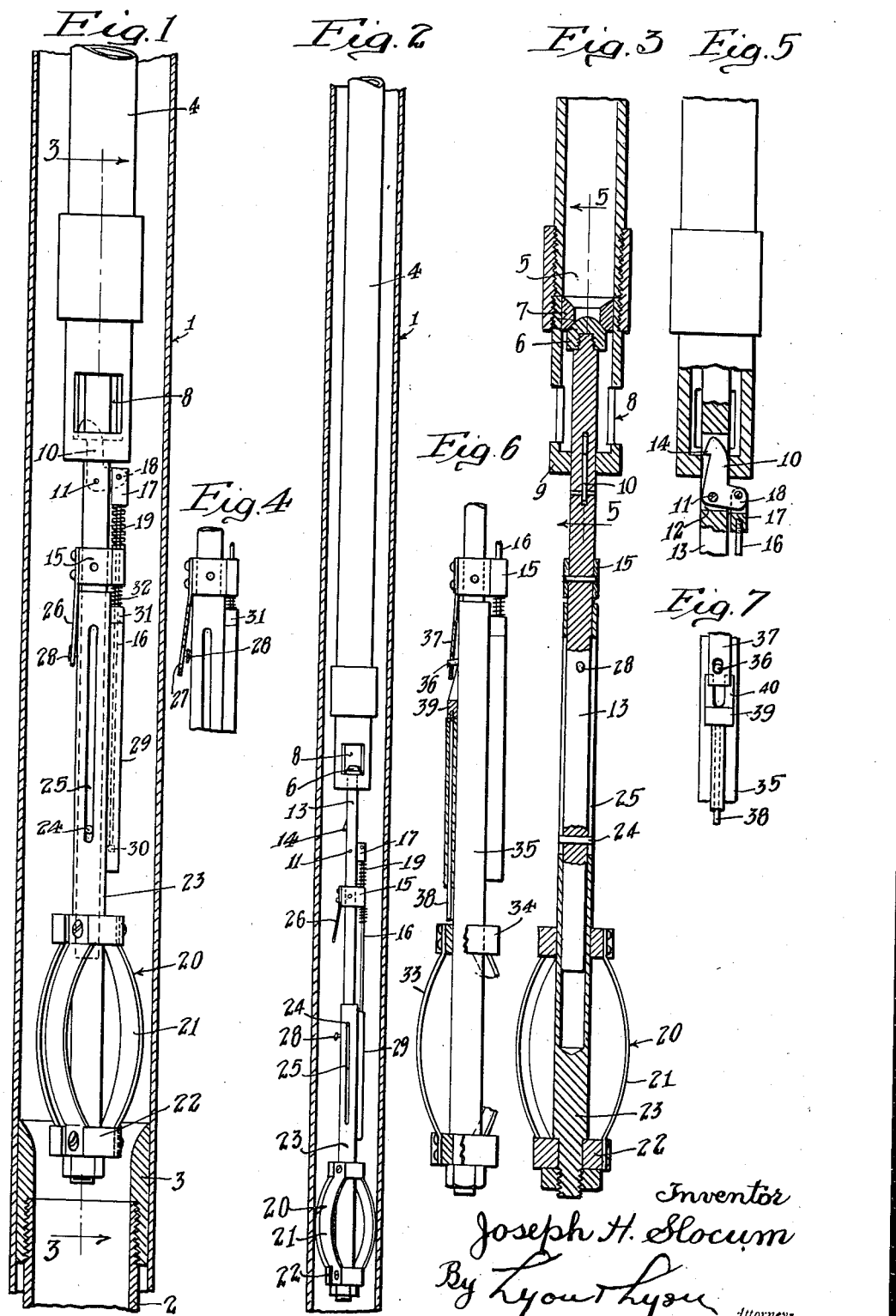

2,013,674

UNITED STATES PATENT OFFICE 2,013,674

WELL CEMENTING APPARATUS

Joseph H. Slocum, Venice, Calif.

Application February 28, 1934, Serial No. 713,245

11 Claims. (Cl. 166—19)

This invention relates to a cement dumper for dumping cement in a liner in a well casing. Heretofore, cement dumpers have been employed, including a cement holder and frictional means carried below the cement holder and connected with it, so that the frictional means and the cement holder are capable of relative up or down movement. When the cement dumper of that type is passing down the well casing, the frictional means engages the well casing and holds it in a relatively elevated position with respect to the cement holder. When the point is reached in the casing where the cement is to be dumped, the cement holder is pulled upwardly, and when this occurs, the frictional means is held relatively fixed by its contact with the casing. This relative upward movement of the cement holder effects the opening of the valve in the bottom of the cement holder, to dump the cement. It is impossible to use a cement dumper of this type to dump cement in a liner, because the frictional means does not engage the casing, which is of considerably larger diameter than the liner. The general object of this invention is to produce a cement dumper having means for holding the frictional means of the cement dumper in a relatively elevated position with respect to the cement holder, while the dumper is descending in the casing, and to provide automatic means for releasing the frictional means automatically when contact is made with the liner. After this is accomplished, by lowering the cement dumper into the liner, the frictional means engages the liner, and after the dumper has been lowered to the point in the liner where the cement is to be dumped, the cement is automatically dumped by raising the cement holder with respect to the frictional means.

A further object of this invention is to provide improved means for holding the valve of the cement dumper in its closed position, and to provide improved means for controlling the same.

Further objects of the invention will appear hereinafter.

The invention consists in the novel parts and combination of parts to be described hereinafter, all of which contribute to produce an efficient well cementing apparatus.

A preferred embodiment of the invention is described in the following specification, while the broad scope of the invention is pointed out in the appended claims.

In the drawing:

Figure 1 is a vertical section through the casing and showing the upper portion of a liner within the same and broken away. This view illustrates my cement dumper in side elevation, and shows the parts in the relation which they have before the contact is made with the liner.

Figure 2 is a view similar to Figure 1, but showing the cement dumper within the liner, with the parts in the relation they have immediately after the cement has been dumped. This view is upon a somewhat reduced scale.

Figure 3 is a vertical section taken about on the line 3—3 of Figure 1, and further illustrating details of the parts.

Figure 4 is a fragmentary view showing parts of the apparatus in the immediate vicinity of the latch device which I employ for temporarily holding the frictional means in a relatively elevated position while descending in the well. In this view, the latch spring is shown in cross section, and shows the parts in the relation which they have immediately after the frictional means has been released, to permit it to have relative downward movement with respect to the cement holder.

Figure 5 is a vertical section taken about on the line 5—5 of Fig. 3, with certain parts shown in elevation, and particularly illustrating the valve latch, and showing the valve latch in its released position.

Fig. 6 is a view shown partially in section and partially in elevation, showing the lower end of the cement dumper and illustrating another embodiment of the means for releasing the frictional means at the moment that contact is attained with the liner.

Figure 7 is a front elevation of the parts shown in Fig. 6, in the vicinity of the latch.

Before proceeding to a more detailed description of the invention, it should be stated that in accordance with this invention, I provide the cement dumper with frictional means preferably carried below the cement holder. This frictional means is constructed in such a way that it passes freely down the casing. The cement holder is provided with an outlet and a valve. When the frictional means arrives at the liner, means are automatically operated to enable the frictional means to have relative downward movement with respect to the cement holder. This lost motion connection effects the opening of the valve. In the preferred embodiment of the invention, I provide means for holding the frictional means in a relatively elevated position with respect to the cement holder, while the dumper is descending in the well. When the lower end of the dumper strikes the liner, this automatically releases the frictional means. The means for effecting this release may be constructed in many different ways; for example, I may accomplish it by providing for a slight relative upward movement of the frictional means to release a spring latch that temporarily holds the frictional means in its relatively elevated position, or I may provide a part associated with the frictional means, which is given a slight upward movement when contact is had with the liner, and the upward movement of this movable part is utilized to release the supporting latch that holds up the frictional means.

Referring more particularly to the parts, and particularly to Figs. 1 to 5, I indicates the casing, and 2 indicates a liner centered in the casing by means of an adapter 3. The cement dumper includes a cement holder 4, which is preferably constructed of tubing and provided with an outlet 5 for the cement, which is normally closed by a valve 6 from below. Below the valve seat 7 that has the outlet 5, the side of the tubing is provided with large ports 8, through which the cement can pass outwardly. The lower end of the holder 4 is provided with a head 9, and at this point I prefer to provide a valve latch 10. This latch is preferably of the form illustrated in Fig. 5, and mounted to rock on a pivot pin 11. The latch is mounted in a vertical slot 12 formed in the valve stem 13, that extends downwardly from the valve.

Means is provided preferably including a spring for holding this latch closed. The latch has an upwardly extending arm with a hook 14 formed at its upper end to engage the upper side of the head 9, to hold the valve closed. In the present instance, I provide a collar 15 fixed on the valve stem a short distance below the latch, and this collar operates as a guide for the upper end of an actuating rod 16, the upper end of which is attached to a knuckle head 17, that is pivotally attached to a short horizontal arm 18 of the valve latch. Between the collar 15 and the knuckle 17, a coil spring 19 is provided, that thrusts upwardly against the knuckle to hold the latch 10 closed.

On the lower end of the valve stem, I provide frictional means which preferably includes a friction sleeve 20 of cage-form, including a plurality of bowed springs 21, the lower ends of which are secured to a collar 22 secured on the lower end of the valve stem. The friction means also includes a tubular sleeve 23 that extends upwardly from the collar 22, and which slides freely on the valve stem, being mounted on the valve stem in any suitable manner, which will permit a relative up and down movement of the sleeve with respect to the valve stem and the cement holder. For this purpose I prefer to employ a pin 24 on the valve stem, which runs in a slot 25 in the tubular sleeve 23. When the cement dumper is passing down the well, the frictional means 20 is held in a relatively elevated position on the valve stem 13. Any suitable means may be employed for this purpose. As illustrated in Figs. 1 to 5, the means for this purpose includes a latch 26 which is preferably in the form of a spring, the upper end of which is secured to the collar 15, and the lower end of which is free and tends to swing outwardly by the resiliency of the spring. The lower end of this spring has an eye 27 in it, which engages a catch or pin 28 projecting out from the side of the tubular sleeve 23. When the bowed springs 21 strike the adapter 3, a slight relative upward movement of the tubular sleeve 23 occurs. This raises the catch 28 and releases it from the latch 26. After this latch is released, a relative upward movement of the cement holder can take place with respect to the frictional means 20. After the dumper has been permitted to descend to the point where the cement is to be dumped, an upward movement of the cement holder will automatically open the valve 6 and dump the cement. In order to accomplish this, I prefer to extend the pull rod 16 down into a guide 29 formed on the side of the tubular sleeve 23. The lower end of this pull rod 16 has a slightly enlarged head 30 on it. The upper end of the guide 29 has a head 31 with a guide opening of sufficient diameter to permit the rod 16 to slide freely through it, but when the head 30 on the rod strikes the head 31, the rod 16 will be pulled downwardly, compressing the spring 19 and releasing the valve latch 10. This frees the cement holder from the valve stem, and the further upward movement of the cement holder will open the valve. The cement holder will move upwardly until the bottom head 9 strikes the valve 6 (see Fig. 2). This permits the cement to flow down through the outlet 5 and through the side ports 8.

In order to insure that the catch 28 will always be pressed downwardly firmly against the lower edge of the eye 27, I prefer to provide a small coil spring 32 around the pull rod, and just below the collar 15. This spring is preferably secured at its upper end to the under side of the collar 15. It is a compression spring and exerts its force against the head 31 at the upper end of the guide 29.

Instead of employing a construction which would involve an upward movement of the entire tubular sleeve 23, any suitable means may be provided involving the use of a part which is associated with the friction sleeve, and adapted to move upwardly when contact is had with the adapter. For example, I may employ construction such as illustrated in Figures 6 and 7. In this construction, I provide bow springs 33 similar to the bow springs 21, and the upper ends of these springs are attached to the collar 34 loosely mounted on the tubular sleeve 35 that corresponds to the tubular sleeve 23. The upper end of the tubular sleeve 35 is provided with a pin 36, preferably in an inclined position, which is engaged by a spring latch similar to the latch 26, but which does not tend to spring open by its own resiliency. This spring latch 37 may tend, by its resiliency, to hold itself in engagement with the catch 36.

When the bow springs or bows 33 engage the adapter, a slight upward movement of the collar 34 takes place. When this occurs, its upper face engages a push rod 38, the upper end of which carries a wedge-form head 39 (see Fig. 6) and this wedge has two forks 40 that engage the inner face of the latch 37 on each side of the catch 36, and pry it off of the catch. After the latch 37 has been released in this way, the cement dumper should be lowered to the point where the cementing is to take place, after which, by pulling up on the cement holder 4, a relative upward movement of the holder with respect to the friction sleeve will take place, which automatically opens the valve in the manner described in connection with Figs. 1 and 2.

It is understood that the embodiment of the invention described herein, is only one of the many embodiments this invention may take, and I do not wish to be limited in the practice of the invention, nor in the claims, to the particular embodiment set forth.

What I claim is:—

1. In a cement dumper for use in dumping cement in a liner of a casing, the combination of a cement holder, frictional means constructed to pass down the casing, for frictionally engaging the liner, and capable of up and down movement relative to the cement holder, holding means for holding the frictional means in a fixed position with respect to the cement holder while the cement dumper is passing down the casing, means actuated by contact of the lower end of the cement dumper with the liner for releasing the holding means, said frictional means constructed to pass into the liner and resist up or down movement of the frictional means within the liner, and means actuated by relative upward movement of the cement holder to release the cement.

2. In a cement dumper for use in a well casing, the combination of a cement holder, frictional means for frictionally engaging the casing, a lost motion connection between the frictional means and the cement holder enabling the frictional means to have a relative up or down movement with respect to the cement holder, holding means for holding the frictional means against relative downward movement with respect to the cement holder while the cement dumper is being passed down the casing, means for effecting the release of the holding means brought into action by relative upward movement of the frictional means with respect to the cement holder, and means for effecting the dumping of the cement from the cement holder actuated by a relative upward movement of the cement holder with respect to the friction sleeve.

3. In a cement dumper for use in a well casing, the combination of a cement holder, frictional means for frictionally engaging the casing, a lost motion connection between the frictional means and the cement holder enabling the frictional means to have a relative up or down movement with respect to the cement holder, latching means for holding the friction sleeve against relative downward movement with respect to the cement holder while the cement dumper is passing down the casing, means for effecting release of the latching means brought into action by the relative upward movement of the frictional means with respect to the cement holder, and means for effecting the dumping of the cement from the cement holder actuated by relative upward movement of the cement holder with respect to the friction sleeve.

4. In a cement dumper for use in a well casing having a liner, the combination of a cement holder having an outlet with a valve for closing the same, a friction sleeve constructed to pass freely down the casing for frictionally engaging the liner, a lost motion connection between the friction sleeve and the cement holder enabling the friction sleeve to have a relative up or down movement with respect to the cement holder, a latch for holding the friction sleeve against relative downward movement with respect to the cement holder while the cement dumper is passing down the casing, and including means operating to engage the liner to effect the release of the latch when the cement dumper reaches the liner, and means for opening the valve to dump the cement actuated by a relative movement of the cement holder with respect to the friction sleeve after the disengagement of the latch, and after the friction sleeve has entered the liner.

5. In a cement dumper for use in a well casing having a liner, the combination of a cement holder having an outlet with a valve for closing the same, said valve having a stem extending longitudinally of the cement holder, a valve latch cooperating with the valve stem for normally latching the valve in its closed position, a friction sleeve for engaging the liner and constructed to pass freely down the casing, a lost motion connection between the friction sleeve and the cement holder enabling the friction sleeve to have a relative up or down movement with respect to the cement holder, a latch for the friction sleeve for holding the same against relative movement with respect to the cement holder while the cement dumper is passing down the casing, means for effecting the release of the last-named latch brought into action by a relative upward movement of the friction sleeve with respect to the cement holder, and means connected with the valve latch for actuating the latch by a relative movement of the cement holder with respect to the friction sleeve after the second-named latch has been released, and after the friction sleeve has entered the liner.

6. In a cement dumper for use in dumping cement in a liner of a casing, the combination of a cement holder, frictional means constructed to pass down the casing for frictionally engaging the liner and capable of up and down movement relative to the cement holder, said cement holder having an outlet for the cement, a valve for closing the outlet and having a stem extending downwardly below the cement holder, a latch spring secured to the stem, said frictional means having a part mounted to slide on the stem and having a catch for engaging the latch spring for holding the frictional means in a relatively elevated position on the stem when the cement dumper is passing down the well casing, said parts cooperating when the friction means engages the liner, to release the latch spring from the catch to permit relative upward movement of the cement holder thereafter, and means actuated by the relative upward movement of the cement holder, to open the valve and dump the cement within the liner.

7. In a cement dumper for use in dumping cement in a liner of a casing, the combination of a cement holder, frictional means constructed to pass down the casing for frictionally engaging the liner and capable of up and down movement relative to the cement holder, said cement holder having an outlet for the cement, a valve for closing the outlet and having a stem extending downwardly below the cement holder, a latch spring secured to the stem, and having a free portion tending by the resiliency of the spring to swing outwardly, said frictional means having a part mounted to slide on the stem and having a catch for engaging the spring to hold the same in constraint to hold the frictional means in relatively elevated position on the stem when the cement dumper is passing down the well casing, said parts cooperating when the friction means engages the liner to raise said sleeve and thereby enable the catch to release the latch spring, thereby permitting relative upward movement of the cement holder thereafter, and means actuated by a relative upward movement of the cement holder for opening the valve to dump the cement within the liner.

8. In a cement dumper for use in dumping cement in a liner of a casing, the combination of a cement holder, frictional means constructed to pass down the casing for frictionally engaging the liner and capable of up and down movement relative to the cement holder, said cement holder having an outlet for the cement, a valve for closing the outlet and having a stem extending downwardly below the cement holder, a latch mounted on the stem, said frictional means having a part mounted to slide on the stem, and having a catch for engaging the latch for holding the frictional means in a relatively elevated position on the stem when the cement dumper is passing down the well, said frictional means having a movable part associated therewith adapted to move when the frictional means engages the liner, and means actuated by said movable part to release the catch from the latch to permit relative upward movement of the cement holder thereafter, and means actuated by the relative upward movement of the cement holder to open the valve and dump the cement within the liner.

9. In a cement dumper for dumping cement in a well, the combination of a cement holder having an outlet, a valve seating on the under side of the outlet, a valve stem carrying the same and guided through the lower end of the cement holder, said stem having a slot therein, a latch pivotally mounted in the slot for engaging the lower end of the cement holder to hold the valve closed, and means for actuating the latch to release the valve.

10. In a dumper for use in dumping a material such as cement in a liner at the lower end of a casing and of smaller diameter than the casing, the combination of a cement holder, frictional means below the cement holder for frictionally engaging the liner, said frictional means being of sufficiently small horizontal width to pass freely down the casing without frictional contact therewith, means on the holder for supporting the frictional means in an elevated position while the holder is passing down the well, said parts cooperating to enable the dumping apparatus to be passed down the casing so that the frictional means will pass into the liner, and means actuated by relative upward movement of the cement holder with respect to the frictional means after the frictional means has entered the liner, for effecting the release of the cement.

11. In a cement dumper for use in dumping cement in a liner of reduced diameter at the bottom of a casing, the combination of a cement holder, frictional means of smaller horizontal width than the interior of the casing so as to pass freely down the casing, for frictionally engaging the liner, and capable of up and down movement relative to the cement holder, holding means for holding the frictional means in a fixed position with respect to the cement holder while the cement dumper is passing down the casing, means brought into action by contact between the frictional means and the liner for effecting a relative upward movement of the friction device to release the holding means, said frictional means constructed to pass down into the liner thereafter and operating to engage frictionally with the liner, and means actuated thereafter by relative upward movement of the cement holder with respect to the friction device to release the cement.

JOSEPH H. SLOCUM.